United States Patent [19]

Nishimura

[11] Patent Number: 4,982,982
[45] Date of Patent: Jan. 8, 1991

[54] ASSISTANT APPARATUS FOR FASTENING A WEBBING

[75] Inventor: Yuji Nishimura, Aichi, Japan

[73] Assignee: Kabushiki Kaisha Tokai-Rika-Denki-Seisakusho, Niwa, Japan

[21] Appl. No.: 492,065

[22] Filed: Mar. 12, 1990

[30] Foreign Application Priority Data

Mar. 13, 1989 [JP] Japan .................. 1-28364[U]

[51] Int. Cl.$^5$ .................. B60R 22/00; B60R 22/18
[52] U.S. Cl. .................................................. 280/808
[58] Field of Search ................ 280/808, 801; 297/468, 297/483, 484, 486

[56] References Cited

U.S. PATENT DOCUMENTS

| | | | |
|---|---|---|---|
| 3,810,657 | 5/1974 | Campbell | 280/808 |
| 3,829,123 | 8/1974 | Holka | 280/808 |
| 3,907,329 | 9/1975 | Erion et al. | 280/808 |
| 4,060,260 | 11/1977 | Collins | 280/808 |
| 4,231,592 | 11/1980 | Scherenberg et al. | 280/808 |
| 4,402,528 | 9/1983 | Fohl | 280/808 |
| 4,405,155 | 9/1983 | Matsuoka | 280/808 |
| 4,465,302 | 8/1984 | Miki et al. | 280/808 |
| 4,531,762 | 7/1985 | Sasaki et al. | 280/808 |
| 4,600,217 | 7/1986 | Naumann et al. | 280/808 |
| 4,629,214 | 12/1986 | Fohl | 280/808 |
| 4,679,821 | 7/1987 | Yamamoto et al. | 280/808 |
| 4,684,153 | 8/1987 | Miller | 280/808 |
| 4,697,827 | 10/1987 | Sasaki et al. | 280/808 |
| 4,775,167 | 10/1988 | Schiller et al. | 280/808 |
| 4,848,796 | 7/1989 | Escaravage | 280/808 |

Primary Examiner—Richard A. Bertsch
Attorney, Agent, or Firm—Sixbey, Friedman, Leedom & Ferguson

[57] ABSTRACT

In an assistant apparatus for fastening a webbing, which is adapted to move an intermediate portion of a webbing in the front direction of a vehicle for aiding an occupant of the vehicle in fastening the webbing around the occupant, a reach arm is provided which supports the webbing passing through the reach arm. The reach arm is capable of being swung in the front and rear directions of the vehicle and is always urged in the front direction by a return spring. The reach arm can be held in a rearward position by a cam engaging therewith, the cam being disengaged by a solenoid when the solenoid is energized. Therefore, a complicated gearing mechanism is unnecessary for driving the reach arm.

17 Claims, 8 Drawing Sheets (A)

(B)

(C)

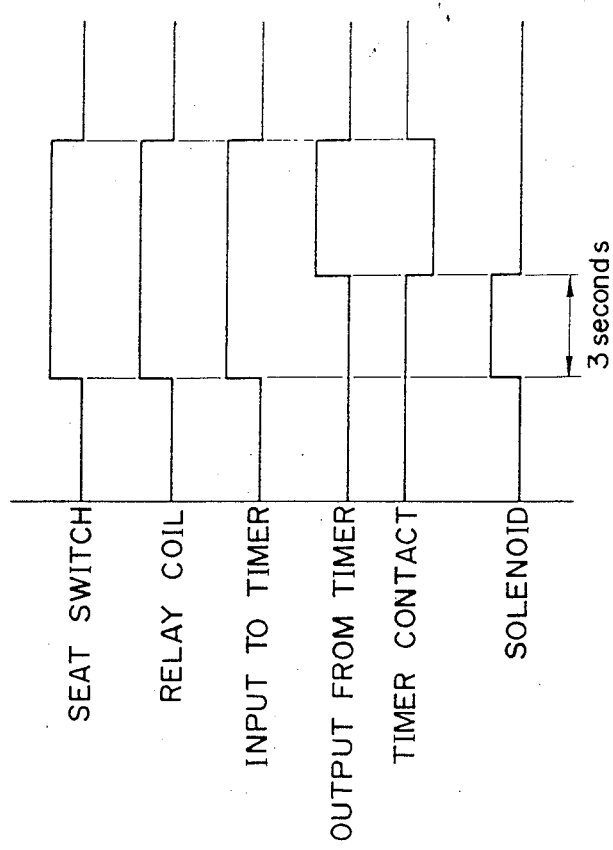

ASSISTANT APPARATUS FOR FASTENING A WEBBING

BACKGROUND OF THE INVENTION

1. Field of the Invention

The present invention relates to an assistant apparatus for fastening a webbing, which aids an occupant of a vehicle to fasten a webbing around the occupant.

2. Description of the Related Art

An assistant apparatus is known which facilitates getting in and out of a rear seat of a vehicle for a rear seat occupant and which aids a front seat occupant's action of fastening a webbing around her or him.

A conventional assistant apparatus has a reach arm mounted on a center pillar of a vehicle, which arm has a free end provided with a slot through which a webbing passes and is supported thereby. Before the occupant sitting on a front seat fastens the webbing around the occupant, the reach arm is swung in a front direction of the vehicle to a position in which an intermediate portion of the webbing is located near the shoulder of the occupant positioned on the side of a door of the vehicle. Thus, the occupant in the front seat can easily grip the intermediate portion of the webbing and fasten it around the occupant.

In the past, two types of driving devices have been used for causing the reach arm to swing toward the front of the vehicle before the occupant in the front seat fastens the webbing: one has an electric motor for driving the reach arm, and the other uses, instead of an electric motor, a wire which interconnects the reach arm and a door of the vehicle for interlocking them together.

In case that the electric motor is used for driving the reach arm, a gearing mechanism is generally necessitated to transmit the driving force of the motor, which makes the driving device rather complicated and costly. In addition, the assistant apparatus becomes rather large in size, so that it becomes hard to provide a space in a vehicle for the installation of the assistant apparatus.

On the other hand, if the reach arm is mechanically interlocked with the door of the vehicle, the tension occurring in the wire between the reach arm and the door when the door is opened will act as a resistance to the operation for opening the door, so that greater efforts of the occupant are necessitated for opening the door and the occupant will then feel rather unpleasant. Further, such arrangements including a wire interconnecting the reach arm and the door are also costly because a large amount of labor is necessitated to install the wire in position.

SUMMARY OF THE INVENTION

In view of the above facts, an object of the present invention is to provide an assistant apparatus for fastening a webbing, which is of a small and simple structure and yet allows a reduction in cost.

The present invention therefore provides an assistant apparatus for fastening a webbing, which is adapted to move an intermediate portion of a webbing in the front direction of a vehicle for aiding an occupant sitting on a seat of the vehicle in fastening the webbing around the occupant. The assistant apparatus includes a reach arm portion which is pivoted on an upper portion of a pillar of the vehicle and which has a free end portion on which an intermediate portion of the webbing is supported. A return spring is provided, which urges the reach arm portion in a direction in which the free end of the reach arm is moved in the front side of the vehicle. A cam is provided, which is engaged with the reach arm portion when the free end of the reach arm is moved in the rear direction of the vehicle against the urging force of the return spring, and which thereby prevents the reach arm portion from being swung in the front direction of the vehicle under the influence of the urging force of the return spring. A solenoid is further provided, which, when electrically energized, releases the reach arm portion from the engagement between the reach arm portion and the cam.

In the assistant apparatus so arranged, the reach arm portion is always urged by the return spring in the direction in which the arm's free end is moved in the front direction of the vehicle.

When the occupant moves the free end of the reach arm portion in the rear direction of the vehicle against the urging force of the return spring, the cam becomes engaged with the reach arm portion thereby to prevent the reach arm from being swung in the front direction of the vehicle by the return spring. Thus, a wide open space which is not obstructed with the webbing is provided behind the seat, so that a rear seat occupant can easily get in or out of the vehicle.

In case that the webbing is fastened around the occupant, the solenoid is energized to release the reach arm portion from the engagement between the reach arm portion and the cam. Thus, the free end of the reach arm portion is moved forwardly of the vehicle by the urging force of the return spring and the intermediate portion of the webbing is thereby positioned adjacent to the shoulder of the occupant. The occupant can then readily grip and handle the webbing for fastening. Since, in accordance with the present invention, the assistant apparatus is arranged such that the swinging motion of the reach arm portion can be carried out merely by the mechanical urging force of the return spring in the above-mentioned simple manner, the assistant apparatus can be implemented in a small-sized structure at low cost.

BRIEF DESCRIPTION OF THE DRAWINGS

FIG. 6 is a diagram showing the mode of operation of the assistant apparatus.

DESCRIPTION OF PREFERRED EMBODIMENT

Figure 4:
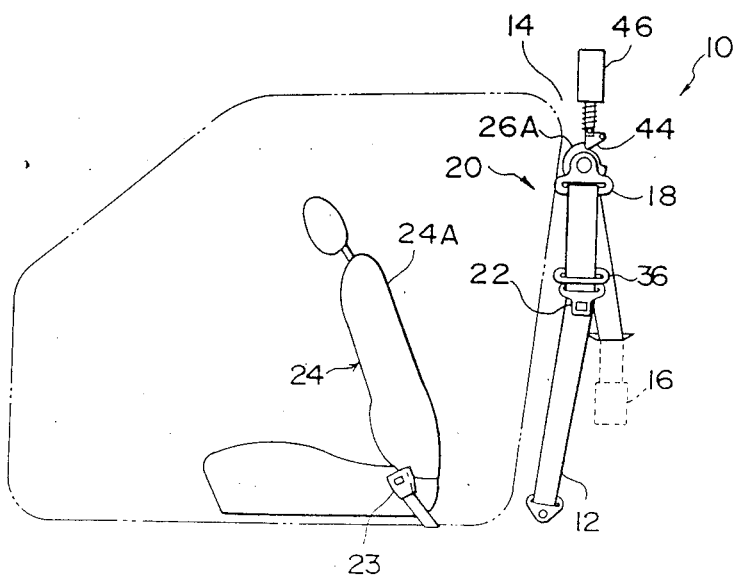
FIGS. 4(A)-4(C) are side views of the entire seat belt system in various operational conditions of the assistant apparatus.
Figure 4:
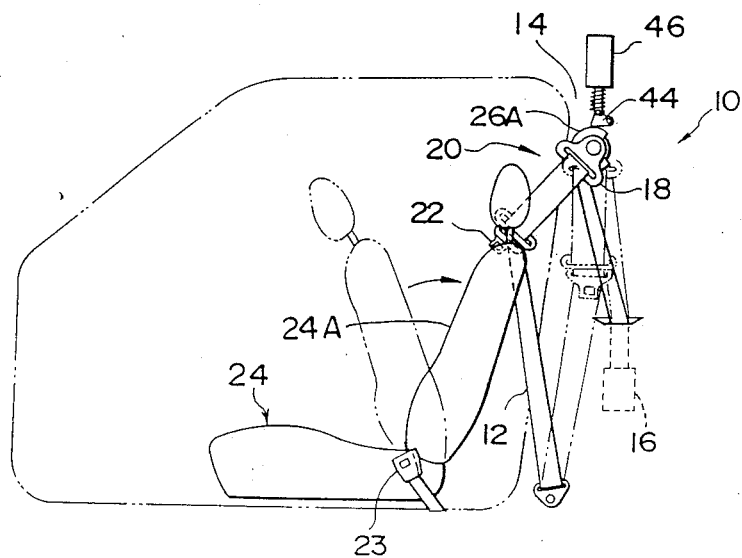
Figure 4:
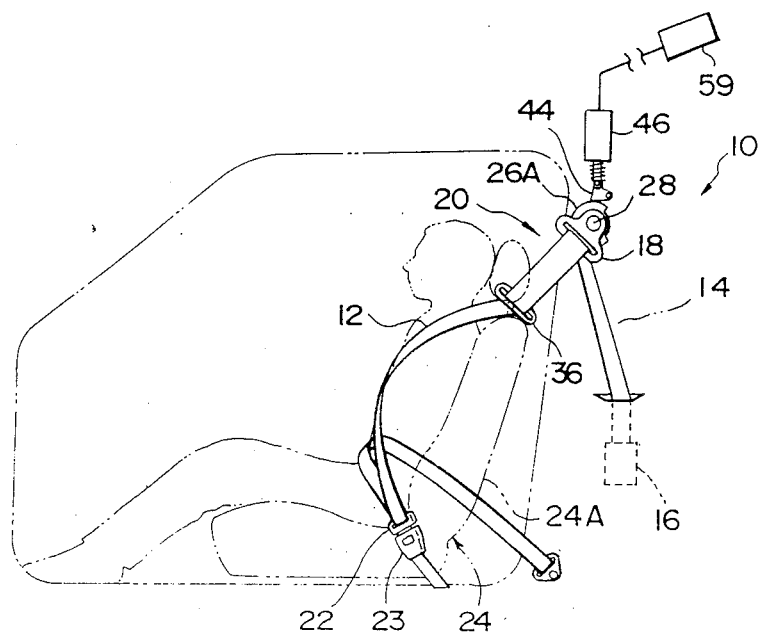

FIGS. 4(A)-4(C) show a seat belt system incorporating an assistant apparatus 10 for fastening a webbing in accordance with the present invention. The seat belt system is for a seat belt or webbing 12 for fastening around an occupant in a front seat 24 of a vehicle; a seat back 24A of the front seat 24 can be inclined in the front direction of the vehicle so that a rear seat occupant can get in and out of the vehicle.

The webbing 12 is wound at its one end portion in a webbing retractor 16 attached to a pillar 14. An intermediate portion of the webbing 12 passes through a slip joint 18, a reach arm portion 20 and a tongue plate 22. The other end of the webbing 12 is secured to a vehicle floor adjacent to the seat 24.

The webbing retractor 16 is attached to an intermediate portion of the pillar 14 and contains an inertia lock mechanism (not shown) for instantaneously stopping the webbing 12 from being pulled out of the webbing retractor 16 in an emergency situation of the vehicle.

Figure 1:
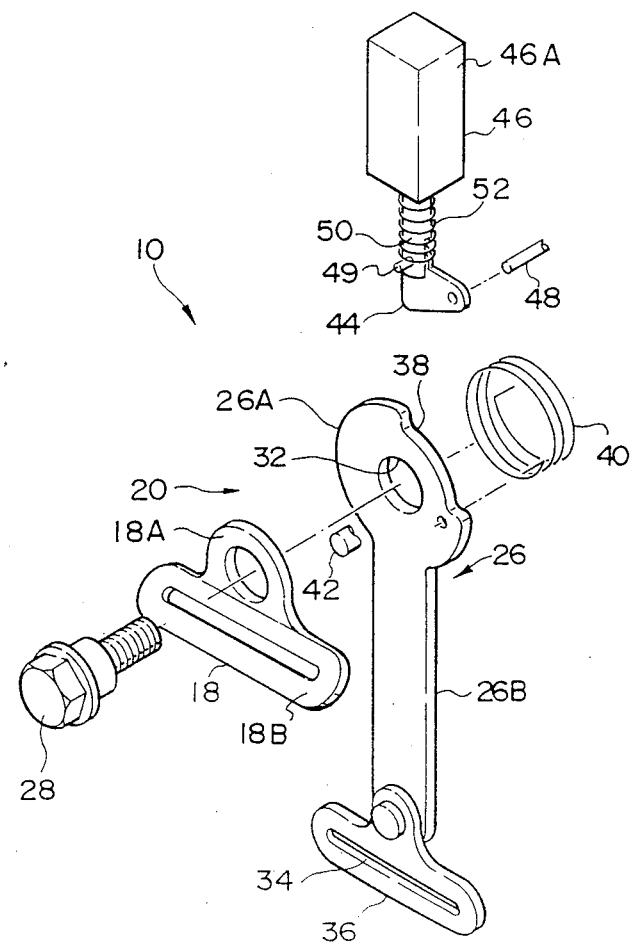
FIG. 1 is an exploded perspective view of an assistant apparatus for fastening a webbing around an occupant in accordance with the present invention.
Figure 2:
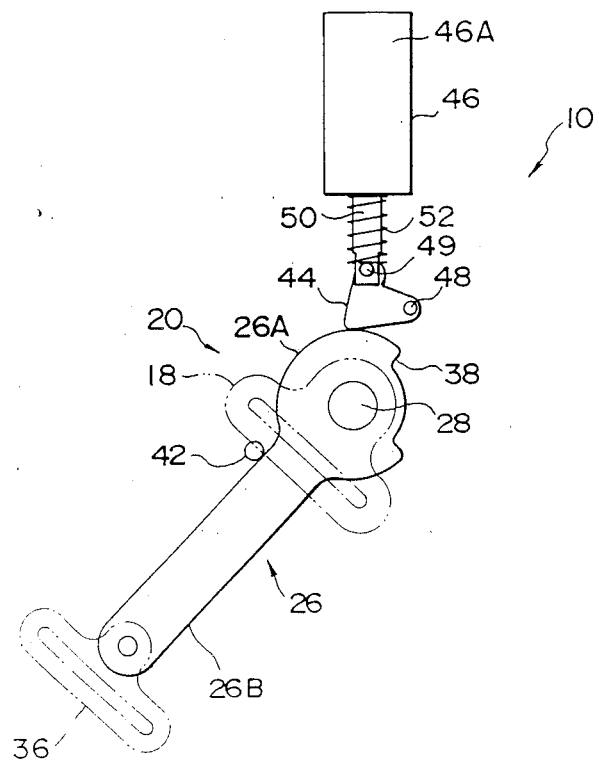
FIG. 2 is a side view of the assistant apparatus in a position in which a cam is disengaged from a corresponding cut.

The slip joint 18 is mounted, coaxially with the reach arm portion 20, to an upper end portion of the pillar 14 by means of a bolt 28. The intermediate portion of the webbing 12 passes through a slot formed in the joint 18, and is turned by the joint 18. As shown in FIG. 1, the slip joint 18 includes a base portion 18A with a hole through which the bolt 28 is inserted, and a turning portion 18B through which the intermediate portion of the webbing 12 is passed and turned. The turning portion 18B is inclined relative to the base portion 18A so as to form a gap between the turning portion 18B and the reach arm portion 20 so that the webbing 12 can be moved smoothly.

The tongue plate 22 is engageable with a buckle device 23 which is placed midway in the lateral direction of the vehicle, and the tongue plate 22 is slidable along the length of the webbing 12.

As shown in detail in FIG. 1, the reach arm portion 20 has a reach arm 26 swingably and coaxially supported with the slip joint 18 by means of the bolt 28. The reach arm 26 is plate-shaped and includes a base portion 26A having a through-hole 32 through which the bolt 28 is inserted and an arm portion 26B extending from the base portion 26A.

At a free end of the arm portion 26B, there is attached a service joint 36 formed with a slot 34 through which the webbing 12 is passed. The intermediate portion of the webbing 12, after passing through and being turned by the slip joint 18, is passed through the slot 34 in the service joint 36 and thus is moved forwardly and backwardly of the vehicle together with the reach arm 26.

The reach arm 26 has a cut 38 formed along a portion of the periphery of its base portion 26A. The return spring 40 has one end secured to the base portion 26A and the other end secured to the pillar 14, thereby to always urge the reach arm 26 in a direction in which the service joint 36 is moved in the front direction of the vehicle.

A pin 42 protrudes from the pillar 14 at a location adjacent to and in front of the arm portion 26B, and serves as a stopper for limiting the forward movement of the reach arm 26.

A cam 44 and a solenoid 26 are provided at a location adjacent to and over the reach arm 46.

The cam 44 comprises a generally triangular plate. The cam 44 is rotatably supported by a pillar 14 by means of a support pin 48 which is inserted through a hole formed in a corner of the triangular cam 44. The cam 44 is arranged such that its another corner (which is hereinafter called "engaging corner") can be engaged with the cut 38 formed on the base portion 26A of the reach arm 26 when the cam 44 is in a predetermined angular position about the support pin 48. The solenoid 46 comprises a solenoid body 46A fixed to the pillar 14, and a plunger 50 driven by the solenoid body 46A. The plunger 50 is connected through a pin 49 to the remaining corner of the cam 44. A compression spring 52 associated with the plunger 50 always urge the plunger 50 in a direction in which the plunger 50 is pushed out of the solenoid body 46A, i.e. in a direction in which the cam 44 presses against the base portion 26A of the reach arm 26. When the solenoid body 46A is not energized and the engaging corner of the cam 44 is located in a position at which it faces the cut 38, the cam 44 is rotated in one direction about the support pin 48 by the plunger 50 so that at the predetermined angular position the engaging corner is inserted into and is engaged with the cut 38 since the plunger 50 is always urged by the compression spring 52 in the direction in which it projects from the solenoid body 46A. When the solenoid body 46A is energized, the plunger 50 is drawn into the solenoid body 46A against the urging force of the compression spring 52 so that the cam 44 is rotated in the reversed direction about the support pin 48 and the engaging corner is thus disengaged from the base portion 26A of the reach arm 26. In other words, in the condition where the engaging corner is in engagement with the cut 38, the engaging corner can be drawn out of the cut 38 when the solenoid body 46A is energized.

Figure 5:
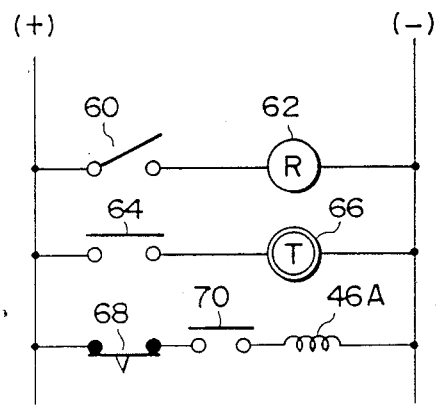
FIG. 5 is a schematic diagram showing the arrangement of a control circuit.

The solenoid 46 is connected to a control circuit 59. In FIG. 5, there is shown the arrangement of the control circuit 59.

The control circuit 59 is connected to an electric power source (not shown). In the control circuit 59, a seat switch 60, which is placed in the seat 24, and a relay coil 62 are connected together in series. The seat switch 60 is closed by inclining the seat back 24A rearwardly. The control circuit 59 further includes a relay contact 64, which is closed by the energization of the relay coil 62, and a timer 66, the contact 64 and the timer 66 being connected together in series. In the control citcuit 59, a series circuit is further included which comprises: a normally closed timer contact 68, which is opened by the action of the timer 66; a relay contact 70, which is closed by the energization of the relay coil 62; and said solenoid body 46A.

The operation of this embodiment will be described.

In the so arranged assistant apparatus 10, the reach arm 26 is always urged in the front direction of the vehicle by the return spring 40. Thus, the arm portion 26B abuts against the pin 42 under the urging force of the return spring 40, and the service joint 36 attached to the free end of the arm portion 26B is in its possible forwardmost position.

Figure 3:
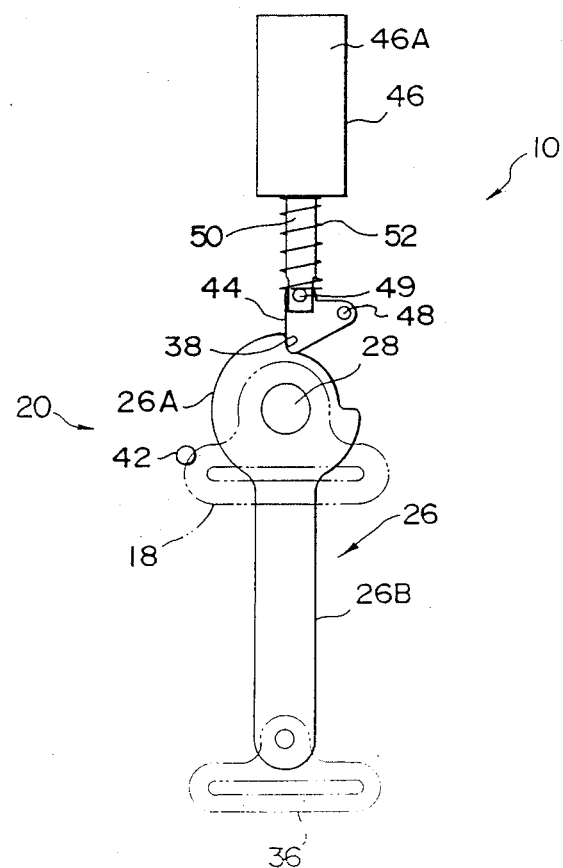
FIG. 3 is a side view of the assistant apparatus in a position in which the cam is placed in the cut.

If the seat back 24A is inclined in the front direction of the vehicle and the reach arm 26 is swung against the urging force of the return spring 40 in the rear direction of the vehicle in order that an occupant gets in or out of the rear seat of the vehicle, the base portion 26A of the reach arm 26 is then rotated about the bolt 28 and the cam 44 is rotated through the plunger 50 by the urging force of the compression spring 52, so that the engaging corner of the cam 44 is thus brought into engagement with the cut 38 formed in the periphery of the base portion 26A. The reach arm 26 is thus prevented from being swung in the front direction of the vehicle by the urging force of the return spring 40 in the position shown in FIG. 3. Therefore, by inclining the seat back 24A toward the front of the vehicle and swinging the reach arm 26 in the rear direction of the vehicle, a broad space not obstructed by the webbing 12 is provided behind the seat 24, as shown in FIG. 4A, so that the rear seat occupant can readily get in and out of the vehicle.

The reach arm portion 20 is then swung by inclining the seat back 24A rearwardly so that an occupant can occupy the front seat 24. FIG. 6 shows the mode of such operation.

The seat switch 60 is closed by inclining the seat back 24A in the rear direction of the vehicle. This causes the relay coil 62 to be supplied with an electric current and energized thereby. The energization of the relay coil 62 in turn causes the relay contact 64 to be closed, whereby the timer 66 begins to operate and the relay contact 70 is closed so that the solenoid 46 is energized.

The solenoid body 46A of the solenoid 46 when energized will draw the plunger 50 into the solenoid body 46A against the urging force of the compression spring 52 and the cam 44 is thus rotated about the support pin 48. As a result, the engaging corner of the cam 44 can get out of the cut 38. Consequently, the reach arm 26 is swung in the front direction of the vehicle by the urging force of the return spring 40, whereby the intermediate portion of the webbing 12 is positioned by the reach arm 26 adjacent to the front seat occupant's shoulder, as shown in FIG. 4B. Thus, the front seat occupant can readily grip and handle the webbing 12.

When a predetermined length of time (for example, about 3 seconds) after the initiation of energization of the solenoid 46 elapsed, the timer 66 times out, i.e. a elapse-of-a-predetermined-time-period signal is output, and the normally closed timer contact 68 is opened. The supply of an electric current to the solenoid body 46A is thereby terminated and thus the operation is completed; the assistant apparatus is thus ready for getting in or out of the rear seat and fastening the webbing.

As described, the assistant apparatus is of a simple structure where the swinging of the reach arm 26 toward the front of the vehicle is performed merely by the urging force of the return spring 40, whereby the driving device for the reach arm 26 can be made compact and a reduction in cost can be achieved.

What is claimed is:

1. An assistant apparatus for fastening a webbing, which is adapted to move an intermediate portion of a webbing in the front direction of a vehicle for aiding an occupant sitting on a seat of the vehicle in fastening the webbing around the occupant, comprising:
   a reach arm portion which is pivoted on an upper portion of a pillar of the vehicle and which has a free end portion on which an intermediate portion of the webbing is supported;
   a return spring which urges said reach arm portion in a direction in which the free end portion of said reach arm portion is moved to the front side of the vehicle;
   a cam which is engaged with said reach arm portion when the free end portion of said reach arm portion is moved in the rear direction of the vehicle against the urging force of said return spring, and which thereby prevents said reach arm portion from being swung in the front direction of the vehicle under the influence of the urging force of said return spring; and
   a solenoid which, when electrically energized, releases said reach arm portion from the engagement between said reach arm portion and said cam.

2. An assistant apparatus as claimed in claim 1, wherein said reach arm portion has a cut provided in a portion of the periphery thereof adjacent to the pivoted portion thereof, and wherein said reach arm portion is prevented from swinging in the front direction of the vehicle by the engagement of a portion of said cam with said cut.

3. An assistant apparatus as claimed in claim 2, wherein said solenoid is associated with a plunger which is connected to said cam and, during the energization of said solenoid, said plunger is drawn into said solenoid to cause said cam to release said reach arm portion from the engagement between said cam and said reach arm portion.

4. An assistant apparatus as claimed in claim 3, wherein said cam is pivoted so as to be rotated when said plunger is drawn into said solenoid.

5. An assistant apparatus as claimed in claim 4, wherein said plunger is always urged by a spring in a direction in which said plunger is pushed out of said solenoid.

6. An assistant apparatus as claimed in claim 5, further comprising swing limiting means abutting on said reach arm portion to limit the swinging motion of said reach arm portion in the front direction of the vehicle.

7. An assistant apparatus as claimed in claim 6, further comprising control means for controlling the energization of said solenoid.

8. An assistant apparatus as claimed in claim 7, wherein said control means is adapted to cause said solenoid to be energized when the seat back of said seat is inclined in the rear direction of the vehicle.

9. An assistant apparatus as claimed in claim 8, wherein said control means includes timer means for terminating the energization of said solenoid when a predetermined time period elapses after the initiation of the energization of said solenoid.

10. An assistant apparatus as claimed in claim 9, wherein said other end of said reach arm portion comprises a ring member through which the intermediate portion of said webbing passes and which is rotatable relative to the other portion of said reach arm portion.

11. An assistant apparatus for fastening a webbing, which is adapted to move an intermediate portion of a webbing in the front direction of a vehicle for aiding an occupant sitting on a seat of the vehicle in fastening the webbing around the occupant, comprising:
    an elongated reach arm portion which has one end pivoted to an upper portion of a pillar of the vehicle, and which has the other end through which an intermediate portion of the webbing is supported movably in the longitudinal direction of the webbing;
    a return spring which urges said reach arm portion in a direction in which said other end of said reach arm portion is moved in the front direction of the vehicle;
    a cam which is engaged with a cut provided in a portion of the periphery of said one end of said reach arm portion when said other end of said reach arm portion is moved in the rear direction of the vehicle against the urging force of said return spring, and which thereby prevents said other end of said reach arm portion from moving in the front direction of the vehicle under the influence of the urging force of said return spring; and
    a solenoid which, when electrically energized, disengages said cam, from said cut of said reach arm portion.

12. An assistant apparatus as claimed in claim 11, wherein said cam is pivoted and said solenoid has a plunger which is drawn into the body of said solenoid during the energization of said solenoid, said cam and said plunger being connected therebetween such that said cam is swung by said plunger being drawn to be disengaged from said cut.

13. An assistant apparatus as claimed in claim 12, wherein said plunger is always urged by a spring in a direction in which said plunger is pushed out of the body of said solenoid.

14. An assistant apparatus as claimed in claim 13, further comprising a pin abutting on said reach arm portion to limit the swinging motion of said reach arm portion in the front direction of said vehicle.

15. An assistant apparatus as claimed in claim 11, further comprising control means for controlling the energization of said solenoid.

16. An assistant apparatus as claimed in claim 15, wherein said control means is adapted to cause said solenoid to be energized when the seat back of said seat is inclined in the rear direction of the vehicle.

17. An assistant apparatus as claimed in claim 16, wherein said control means includes timer means for terminating the energization of said solenoid when a predetermined time period elapses after the initiation of the energization of said solenoid.

* * * * *